April 8, 1952

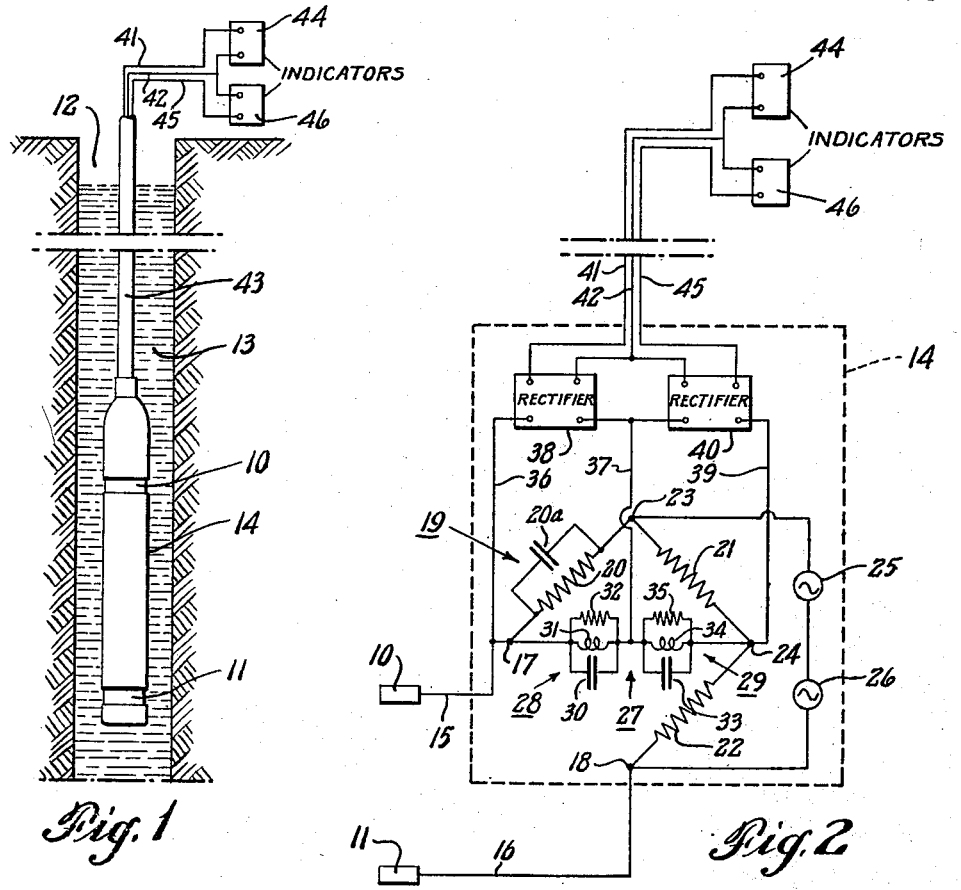

C. B. AIKEN 2,592,101

ELECTRICAL LOGGING

Original Filed Feb. 4, 1942

INVENTOR:
CHARLES B. AIKEN
BY
Hoguet, Neervys Campbell
his ATTORNEYS

April 8, 1952  C. B. AIKEN  2,592,101
ELECTRICAL LOGGING
Original Filed Feb. 4, 1942  3 Sheets-Sheet 3

INVENTOR:
CHARLES B. AIKEN
BY
Hoguet, Leary & Campbell
his ATTORNEYS

Patented Apr. 8, 1952

2,592,101

UNITED STATES PATENT OFFICE 2,592,101

ELECTRICAL LOGGING

Charles B. Aiken, Houston, Tex., assignor to Schlumberger Well Surveying Corporation, Houston, Tex., a corporation of Delaware Original application February 4, 1942, Serial No. 429,476. Divided and this application October 10, 1945, Serial No. 621,458

11 Claims. (Cl. 175—182)

The present invention relates to the investigation of subterranean strata traversed by a bore hole and more particularly to a new and improved method and apparatus for obtaining indications which are related to variations in the dielectric constant of such strata at different depths in a bore hole.

This is a division of application Ser. No. 429,476 filed February 4, 1942, now Patent No. 2,390,409 issued December 4, 1945.

Indications related to the dielectric constant of earth formations may be readily obtained by investigating the capacitive reactance of the formations to alternating current. At relatively low frequencies, that is, frequencies below about 200,000 cycles, the impedance of the soil is predominantly resistive, and relatively high frequencies must be employed in order to obtain impedance values having reactive components that are large enough to reflect variations in the dielectric constant of the formations. The use of frequencies high enough for this purpose, however, introduces a number of undesirable factors which make it difficult to obtain accurate indications. For example, if the high frequency indications obtained in the bore hole are transmitted through relatively long conductors to indicating means at the surface of the earth, prohibitive errors may be introduced by variations in the impedance of those conductors and by other variable stray capacitances as the investigating apparatus traverses the bore hole.

It is an object of the present invention, accordingly, to provide a new and improved method and apparatus for obtaining indications of variations in the dielectric constant of earth formations traversed by a bore hole which is characterized by simplicity and accuracy of operation.

A further object of the invention is to provide a method and apparatus of the above character in which indications of variations in the dielectric constant of the formations are transmitted to the surface of the earth in the form of direct current values or alternating current values of low frequency.

A still further object of the invention is to provide a novel method and apparatus for obtaining indications of the phase difference between two electrical values, such as a current and a voltage, for example, which may be of variable magnitude.

A further object of the invention is to provide a novel method and apparatus of the above character in which an electrically energized electrode is disposed in a bore hole and indications are obtained of the phase difference between the voltage between the electrode and a reference point and the current flowing through the electrode.

Another object of the invention is to provide a novel method and apparatus of the above character in which indications are obtained of the phase difference between a high frequency alternating current passed through the formations and the potential difference between two points in the path of the current, which indications are transmitted to indicating means at the surface of the earth as direct current values or alternating current values of low frequency.

In accordance with the invention, high frequency alternating current is passed through the formations surrounding the bore hole and high frequency indications are obtained which are related to the dielectric constant of the formations. Specifically, high frequency indications are obtained of variations in the phase angle between the current flowing in the formations and the potential difference between two points in the current path. The high frequency indications obtained are converted either to direct current values or to alternating current values of low frequency, which may be transmitted with ease through relatively long conductors to suitable indicating means at the surface of the earth.

Additional objects and advantages of the invention will appear from the following detailed description of several preferred embodiments, taken in conjunction with the accompanying drawings, in which:

Figure 1 is a schematic diagram of apparatus constructed according to the invention for studying the dielectric constant of subterranean formations traversed by a bore hole;

Figure 2 is a schematic diagram of one form of electrical circuit for obtaining indications of the dielectric constant of the formations;

Figure 3 is a schematic diagram of a modified circuit in which indications are obtained of the differences of phase between the current flowing through the formations and the potential difference between two points in the path of the current through the earth;

Figure 2A:
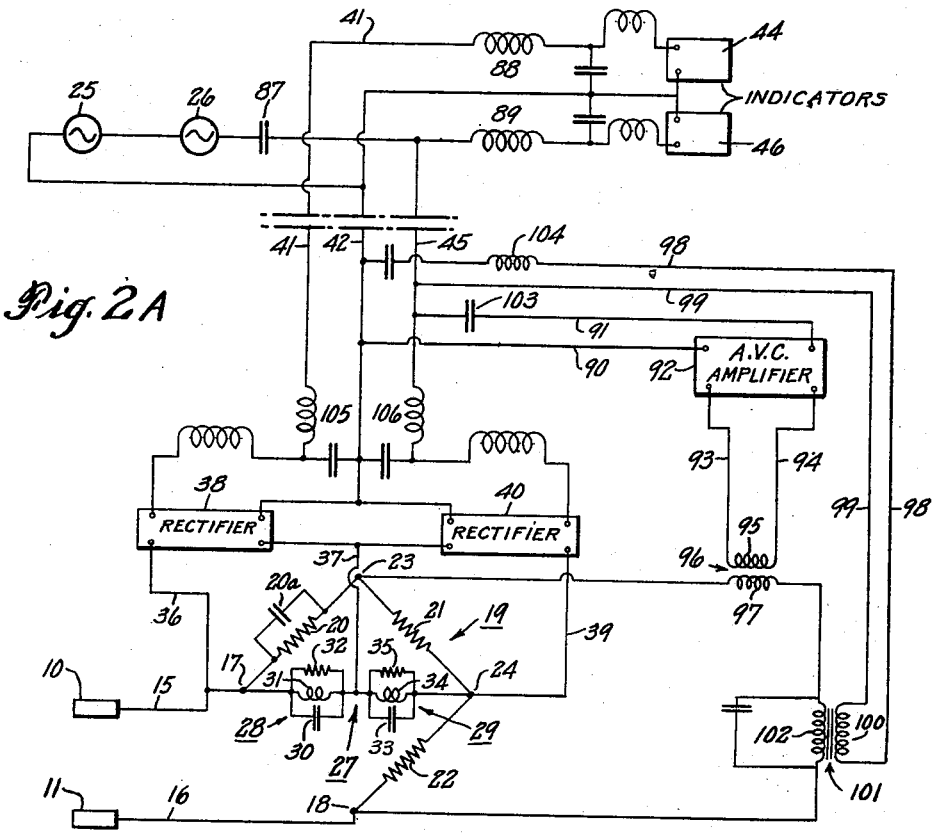
Figure 2A is a schematic diagram of a modification of Figure 2 in which the sources of electrical energy are located at the surface of the earth.

Referring now to Figures 1 and 2, a pair of spaced apart electrodes 10 and 11 are shown disposed at a given depth in a bore hole 12 containing a liquid 13. The electrodes 10 and 11 may be of any suitable size, shape and spacing and they are preferably mounted on an insulated, watertight casing 14 within which a source of electrical energy and part of the indicating circuit may be contained.

As shown in Figure 2, the electrodes 10 and 11 are connected through the conductors 15 and 16, respectively, to the apices 17 and 18, respectively, of a conventional type, alternating current, impedance bridge 19 mounted within the casing 14. The impedance bridge 19 comprises a plurality of fixed or adjustable impedances 20, 20a, 21 and 22 which are connected as shown in the drawing to form the other two apices 23 and 24 of the bridge, the electrodes 10 and 11 and the intervening earth formations constituting one of the arms thereof. The values of the impedance 20, 20a, 21 and 22 should preferably be so chosen that the bridge 19 is balanced or nearly so when the impedance between the electrodes 10 and 11 is approximately the minimum formation impedance encountered along the bore hole 12.

Connected across the apices 23 and 18 of the bridge 19 are two series connected sources of alternating current 25 and 26 which supply electrical energy for the energization of the bridge 19. The source 25 is adapted to generate alternating current of relatively low frequency, for example, about 400 cycles per second, and the source 26 is adapted to generate a relatively high frequency, such as, for example, 20 megacycles per second. To the apices 17 and 24 of the bridge 19 is connected an indicating circuit 27 including a pair of series connected filter networks 28 and 29 which are responsive only to alternating currents of 400 cycles and 20 megacycles, respectively.

The filter network 28 may be designed in any conventional manner, and it may include, for example, a condenser 30, an inductance 31 and a resistance 32 connected in parallel and tuned to parallel resonance at a frequency of 400 cycles. Similarly, the filter network 29 may include a condenser 33, an inductance 34 and a resistance 35, also connected in parallel and tuned to parallel resonance at a frequency of 20 megacycles. The 400 cycle output of the filter network 28 is transmitted through the conductors 36 and 37 to a conventional type detector or rectifier 38, and the output of the filter network 29 is transmitted through the conductors 37 and 39 to another conventional type detector or rectifier 40.

The output of the rectifier 38, which is proportional to the 400 cycle voltage output of the bridge 19, is transmitted through the conductors 41 and 42 in the supporting cable 43 to a suitable indicator 44, preferably of the recording type, located at the surface of the earth. In similar fashion, the output of the rectifier 40 is transmitted through the conductors 45 and 42 in the supporting cable 43 to a second indicator 46 located at the surface and also preferably of the recording type.

In operation, the casing 14 with the electrodes 10 and 11 mounted thereon is moved through the bore hole 12 at any desired rate of speed while electrical energy is continuously supplied to the apices 23 and 18 of the bridge 19 from the 400 cycle and 20 megacycle sources 25 and 26, respectively. As the electrodes 10 and 11 pass formations of different electrical impedance, the impedance of the arm of the bridge 19 in which they are included will vary and thus produce a corresponding unbalance of the bridge 19. Since the impedance of the filter 29 at 400 cycles is negligible, substantially all of the 400 cycle unbalance voltage, which is principally a function of the resistivity of the surrounding formations, will appear across the filter network 28. From thence it is transmitted through the conductors 36 and 37 to the rectifier 38 where it is converted into a direct current, the magnitude of which is proportional to the magnitude of the 400 cycle input to the detector or rectifier 38. The direct current output of the rectifier 38 is transmitted through the conductors 41 and 42 in the supporting cable 43 to the recording type indicator 44, thereby providing a continuous record of the resistivity of the formations surrounding the bore hole 12 as the casing 14 is moved therethrough.

Meanwhile, substantially all the 20 megacycle unbalance voltage, which is predominantly a function of the reactance of the surrounding earth formations, appears across the filter network 29 because its impedance at 20 megacycles is very high whereas the impedance of the filter 28 at that frequency is negligible. This 20 megacycle voltage is transmitted through the conductors 37 and 39 to the rectifier 40 where it is converted into a direct current, the magnitude of which is a function of the 20 megacycle voltage input to the rectifier 40. The direct current output of the rectifier 40 is transmitted through the conductors 45 and 42 in the supporting cable 43 to the recording type indicator 46 at the surface of the earth where it provides a continuous record of variations in the impedance of the earth formations traversed by the bore hole.

The relative contributions of soil resistance and reactance to the total impedance will depend upon the type of formation and upon the frequency used. At 20 megacycles, the impedance of many formations will be predominantly reactive, although some may show effects of resistance. In any event, the impedance curve obtained will differ radically from that obtained at low frequencies and will be a valuable guide to the variations in dielectric constant of the formations. By employing a lower frequency, the relative importance of the capacity reactance of the soil will be reduced, while if a high frequency is used, it will be increased.

It will be observed that the apparatus described in detail and illustrated in Figure 2 of the drawings provides simultaneously records of variations in the resistivity and in the dielectric constant of the earth formations as the casing 14 and the electrodes 10 and 11 traverse the bore hole 12.

If desired, the 20 megacycle voltage supplied by the source 26 might be modulated with a low frequency voltage, such as, for example, about 250 cycles per second, in which case the output of the rectifier 40 would contain a 250 cycle component of voltage, variations in the magnitude of which would be proportional in magnitude to variations in the dielectric constant of the formations. Where this is done, the recording type indicator 46 should be designed to provide indications of 250 cycle alternating current values, only.

The rectifier 38 may also be omitted, in which case the 400 cycle output of the bridge 19 could be transmitted to the surface of the earth through the same conductors in the cable 43 as are used for the 250 cycle voltage. This alternative requires that the recording type indicators 44 and 46 be responsive only to 400 and 250 cycle alternating currents, respectively. The source 25 might also be a source of direct current, in which event the indicator 44 should be responsive only to direct current values. When the source 25 is direct current, a direct current bridge unbalance appears between apices 17 and 24, with the result that part of the unbalance appears between 17 and the midpoint between the filters 28 and 29. The proportion of direct current unbalance voltage that appears across the filter 28 and, therefore, between the conductors 41 and 42, depends only upon the ratio of the resistances 35 and 32 in the two filter circuits. The 20 megacycle signal will have superimposed upon it the amount of the direct current signal that appears across the resistance 35. This signal is very small and the direct current supplied to the rectifier 40 will be too small to have any significance.

As a further modification, the sources 25 and 26 might be located at the surface of the earth and alternating current supplied therefrom to the bridge 19 in the bore hole 12 through suitably shielded electrical transmission lines, as illustrated in Figure 2A. In that figure, the sources 25 and 26 are shown connected to the conductors 42 and 45 in the supporting cable 43. In order to prevent the flow of direct current from the conductors 42 and 45 to the sources 25 and 26, it is desirable to insert a condenser 87 in series therewith as shown in the figure. It is also desirable to insert conventional type low pass filters 88 and 89 between the conductors 41 and 42 and the indicating instrument 44 and between the conductors 42 and 45 and the indicating instrument 46, respectively, for the purpose of preventing the passage of alternating current from the sources 25 and 26 to the indicating instruments 44 and 46.

The 20 megacycle alternating current from the source 26 is transmitted through the conductors 42 and 45 and the conductors 90 and 91 to the input terminals of a conventional type amplifier 92, which is provided with automatic volume control so that its output will remain constant regardless of variations in the magnitude of the input thereto. A condenser 103 may be inserted in series with the conductor 91 to block the passage of direct current and low-frequency alternating current to the amplifier 92. The output of the amplifier 92 is transmitted through the conductors 93 and 94 to the primary winding 95 of a transformer 96, the secondary winding 97 of which is connected to the apices 23 and 18 of the bridge 19.

The 400 cycle alternating current from the source 25 is transmitted through the conductors 42 and 45 and the conductors 98 and 99 to the primary winding 100 of a transformer 101, the secondary winding 102 of which is connected in series with the secondary winding 97 of the transformer 96. A choke coil 104 may be inserted in series with the conductor 98 for blocking the passage of 20 megacycle alternating current to the transformer 101.

By virtue of the automatic volume control feature of the amplifier 92, the 20 megacycle voltage supplied to the bridge 19 will remain substantially constant in magnitude regardless of any material attenuation that may occur in transmission through the relatively long supporting cable 43. The attenuation of the 400 cycle alternating current in its transmission through the supporting cable 43 will be relatively small and consequently an automatic volume control amplifier is not required, although one could be used, if desired.

In order to prevent the power voltages from the sources 25 and 26 from affecting the rectifiers 38 and 40, conventional type low-pass filters 105 and 106, respectively, may be inserted between the rectifier 38 and the conductors 41 and 42 and between the rectifier 40 and the conductors 42 and 45, as shown in Figure 2A. The filters 105 and 106 are shown as conventional one-section filters, but additional sections may be used, if desired. Even with this embodiment there will be a limit to the depth of hole that can be surveyed with a high frequency source of power located at the surface of the earth because of excessive attenuation produced in the cable 43 at great depths.

In the modification illustrated in Figure 3 of the drawings, indications are obtained of the difference in phase between an alternating current transmitted through the earth formations surrounding the bore hole, and the potential difference between two points in the current path, which difference in phase is known to be a function of the dielectric constant of the formations.

The apparatus for accomplishing this result includes a source of alternating current of high frequency 26, such as, for example, 20 megacycles, which is located within the casing 14 and which is connected through the conductor 47 to the electrode 10 and through the conductor 48 and a fixed resistance 49 to the electrode 11. The resistance 49 should be substantially non-inductive and non-capacitive so that the potential drop across it will be in phase with the current flowing therethrough. The potential difference across the resistance 49 is supplied through the conductors 50 and 51 to the input terminals of a conventional type amplifier 52 having automatic volume control. The function of this amplifier is to provide an output which is substantially constant in magnitude regardless of variations in the input voltage and the phase of which is substantially identical with, or bears a fixed relation to, the phase of the voltage input.

The potential difference produced between the electrodes 10 and 11 by the passage of the alternating current through the earth formations surrounding the bore hole 12 is supplied through the conductors 53 and 54 to the input terminals of a second conventional type amplifier 55 which is also provided with automatic volume control so that its output is substantially constant in magnitude and substantially identical in phase with the input voltage. The ground output terminals of the amplifiers 52 and 55 are connected together through a conductor 56 and the other output terminals of the amplifiers 52 and 55 are connected together through a pair of series connected resistors 57 and 58, the common point 59 between the resistors 57 and 58 being connected to the ground conductor 56 through a conductor 60. It is not essential that the phase of each amplifier output voltage be the same as that of its input voltage, provided any phase shift between input and output is the same for both amplifiers.

It will be apparent from the connections described above and illustrated in Figure 3 that if the output voltages of the amplifiers 52 and 55 are the same in magnitude and 180° out of phase, the potential difference across the two series connected resistors 57 and 58 will be zero. Moreover, since both the amplifiers 52 and 55 have automatic volume control, the magnitudes of their voltage outputs will remain substantially constant. Hence, any potential difference appearing across the series connected resistors 57 and 58 will be directly related to the difference in phase between the voltage outputs of the two amplifiers, which difference of phase is a function of the dielectric constant of the earth formations in the vicinity of the electrodes 10 and 11 in the bore hole 12.

The potential difference existing across the series connected resistors 57 and 58 is transmitted through the conductors 61 and 62 to a conventional type rectifier 62a, the direct current output of which is transmitted through the conductors 42 and 45 in the cable 43 to the recording type indicator 46 at the surface of the earth. As the casing 14 and the electrodes 10 and 11 traverse the bore hole 12, the recording type indicator 46 will provide a continuous record which will be related to variations in the dielectric constant of the formations in the vicinity of the electrodes 10 and 11.

Figure 4A:
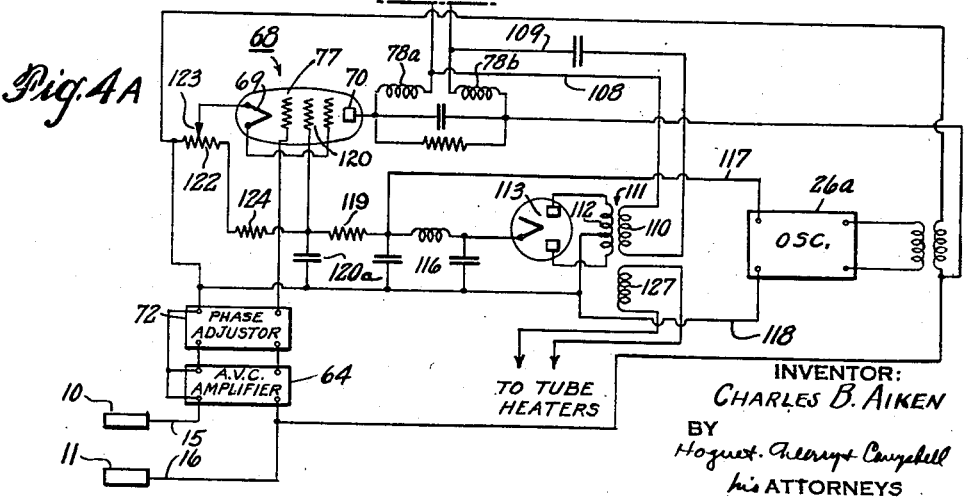
Figure 4A is a schematic diagram of a modification of Figure 4 in which the source of power for the apparatus in the bore hole is located at the surface of the earth.
Figure 4:
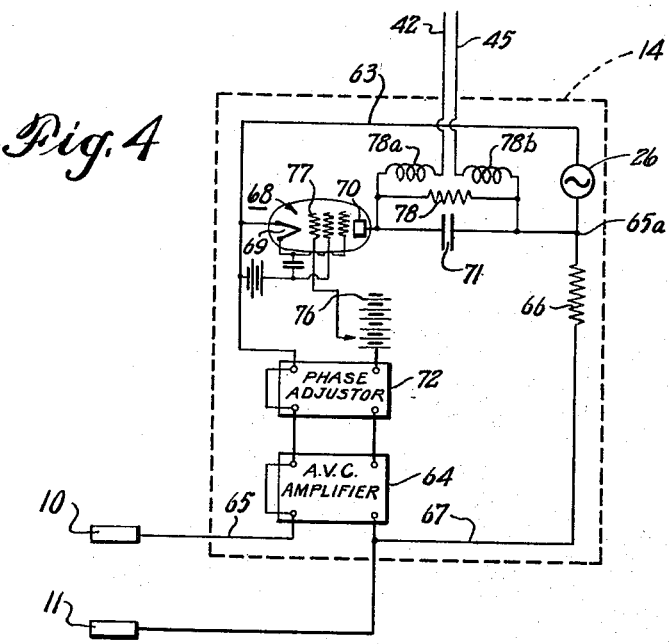
Figure 4 illustrates another circuit for obtaining indications of phase variations.

An alternative form of apparatus for comparing the phase of the current transmitted through the formations with the phase of the potential difference between the electrodes 10 and 11 is illustrated in Figure 4. Referring to Figure 4, one terminal of the source 26 in the casing 14 is connected through the conductor 63 to the electrode 10 and to the ground output and input terminals of a conventional type amplifier 64 provided with automatic volume control. The other terminal of the source 26 is connected through a conductor 65a, a resistance 66 and the conductor 67 to the ungrounded input terminal of the amplifier 64 and to the electrode 11, thereby establishing a 20 megacycle alternating current field in the intervening earth formations between the electrodes 10 and 11.

The output voltage of the high frequency source 26 is also supplied to a conventional type pentode vacuum tube 68, the cathode 69 of which is connected to the conductor 63 and the plate 70 of which is connected through a condenser 71 to the conductor 65a. The current through the resistance 66 and the electrode 11 bears a definite phase relation to the potential impressed upon the plate 70. The potential difference between the electrodes 10 and 11, the phase angle of which is a function of the dielectric constant of the adjacent earth formations, is impressed upon the input terminals of the amplifier 64. The output of the amplifier 64, which is held substantially constant in magnitude and is in phase with, or bears a fixed phase relation to, the input voltage, is supplied to a conventional type phase adjusting means 72 which serves to adjust the phase of the output of the amplifier 64. One output terminal of the phase adjusting means 72 is connected in series with a variable voltage, grid biasing battery 76 to the control grid 77 of the pentode 68. The other output terminal of the phase adjusting means 72 is connected to the cathode 69 of the pentode 68.

When the phase of the potential difference between the electrodes 10 and 11 differs by only a small amount (the minimum to be expected in a given run or a given geographical region) from the potential applied between the cathode 69 and the plate 70 of the pentode 68, the latter is adjusted to pass no plate current. This is accomplished by operating the phase adjusting device 72 and the variable bias 76 until the control grid 77 of the tube 68 goes negative when the plate 70 goes positive, the magnitude of the grid voltage being just sufficient to prevent the flow of plate current. When the alternating voltage applied to the grid has a positive sign, the plate voltage will be negative and current will still fail to flow. However, if the phase of the voltage delivered by the amplifier 64 changes, because of changes in phase of the voltage across the electrodes 10 and 11, the grid 77 will not be at its most negative potential when the plate voltage is at a positive peak, and as a result plate current will pass through the tube 68. The larger the shift in the phase across the electrodes 10 and 11, the larger will be the plate current. The rectified, or D.-C., component of this plate current will be a measure of the phase shift.

The direct current component of the output of the pentode 68 is transmitted through a resistance 78, connected in parallel with the condenser 71. The potential drop across the resistance 78 is transmitted through the conductors 42 and 45 in the supporting cable 43 to the recording type indicator 46 at the surface of the earth. In this fashion, a continuous record is provided of a function of variations in the dielectric constant of the earth formations in the vicinity of the electrodes 10 and 11. If desired, a pair of choke coils 78a and 78b may be placed in series with the conductors 42 and 45, respectively, to prevent alternating current from passing therethrough. These are not essential, however. Other suitable tubes may also be used in place of the pentode 68.

The power for operating the equipment in the investigating apparatus 14 can, if desired, be transmitted from the surface as an alternating current of low frequency substantially different from any of the frequencies used in the measuring operations, as shown in Figure 4A. Referring to this figure, a source of alternating current 114 of 700 cycles frequency, for example, is connected to the conductors 42 and 45. A conventional type filter 107 may be inserted between the conductors 42 and 45 and the direct current indicating instrument 46 for the purpose of blocking the passage of alternating current to the latter. At the lower end of the cable 43 in the bore hole, the alternating current is transmitted through the conductors 42 and 45 and the conductors 108 and 109 to the primary winding 110 of a transformer 111, the secondary winding 112 of which is connected to a conventional full-wave rectifier 113 of any suitable type.

The output of the rectifier 113 is filtered by a conventional type inductance-capacity filter 116. Direct current voltage for the operation of the oscillator 26a is supplied from the terminals of the filter 116 through the conductors 117 and 118. Voltage for the operation of the screen grid 120 of the pentode 68 is supplied through a resistance 119, and a by-pass condenser 120a is connected between the screen grid 120 and ground.

Grid biasing voltage for the pentode 68 is provided by means of a variable resistor 122, the variable contact 123 of which is connected to the cathode 69 of the pentode 68 and the terminals of which are connected through a resistance 124 and the resistance 119 to the terminals of the filter 116. The heaters of the pentode 68 and the vacuum tubes in the oscillator 26a may be energized by 700 cycle alternating current obtained from a secondary winding 127 on the transformer 111.

Except for the differences noted above, the circuit shown in Figure 4A is identical with the circuit shown in Figure 4 and it operates essentially in the same manner in so far as the well logging operations are concerned.

Figure 5:
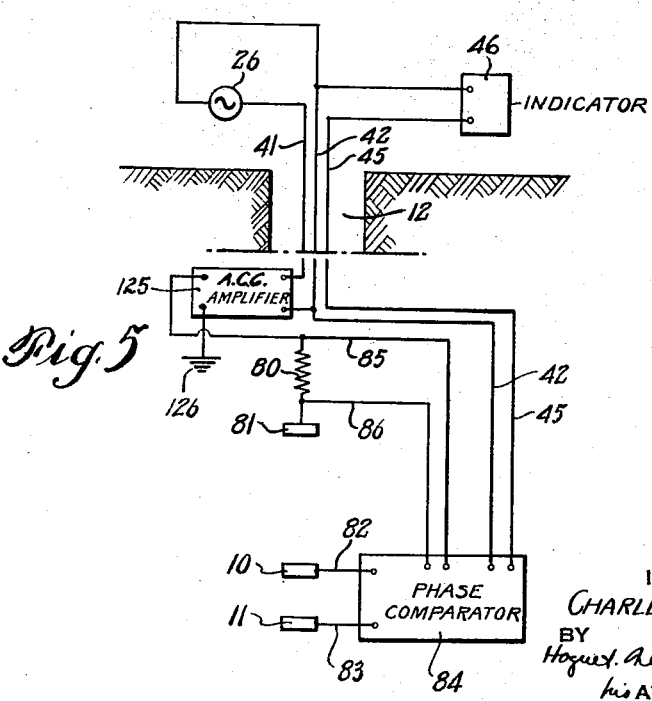
Figure 5 is a schematic diagram of apparatus including a power circuit and a separate potential circuit for obtaining indications of the dielectric constant of the surrounding formations.

In the embodiment illustrated in Figure 5 of the drawings, the high frequency source 26 is located at the surface of the earth, its terminals being connected through the conductors 41 and 42 in the supporting cable 43 to the input terminals of a conventional amplifier 125 having automatic current control. One output terminal of the amplifier 125 is connected to a ground electrode 126 in the drill hole which is preferably some distance from electrodes 81, 10 and 11. The remaining output terminal of the amplifier 125 is connected to a fixed, substantially non-inductive and non-capacitive resistance 80 which in turn is connected to an electrode 81 disposed in the bore hole. Because of the automatic control feature of the amplifier 125, this circuit sets up a substantially constant alternating current flow into the earth formations surrounding the bore hole.

Directly below the electrode 81 and spaced apart therefrom are located the two electrodes 10 and 11 which are connected through the conductors 82 and 83, respectively, to the input terminals of a phase comparing device 84 located within the casing 14, which may be of the type shown in either of Figures 3 and 4 and described hereinabove. The potential difference across the resistance 80, which is in phase with the current flowing to the electrode 81, is supplied through the conductors 85 and 86 to the phase comparing device 84. The direct current or low frequency alternating current output of the device 84 is transmitted through the conductors 42 and 45 in the supporting cable 43 to the recording type indicator 46 at the surface of the earth. The output of the device 84 would be a function of the phase difference between the voltage across resistance 80, and that appearing between electrodes 10 and 11.

While the several embodiments described above are intended for use in a bore hole containing a liquid, they may be employed in dry or oil filled holes by substituting brush type electrodes for the electrodes 10 and 11. Electrodes suitable for this purpose are disclosed in prior Patent No. 2,233,420 to Eugene G. Leonardon, for example.

It will be readily apparent from the foregoing description that the applicant's invention enables indications to be obtained of variations in the dielectric constant of earth formations traversed by a bore hole more accurately and with greater simplicity than has been possible heretofore. By virtue of the fact that the high frequency indications obtained in the bore hole are transmitted to the surface of the earth as direct current values or alternating current values of low frequency, the difficulties encountered heretofore in transmitting the high frequency indications obtained to the surface of the earth have been entirely eliminated.

The several embodiments of the invention described above are intended merely to be illustrative and not restrictive, and they are susceptible of numerous changes in form and detail within the scope of the appended claims.

I claim:

1. Apparatus for investigating earth formations traversed by a bore hole, comprising a pair of spaced apart electrodes in the bore hole, a source of high frequency alternating current connected to said electrodes, a substantially pure resistance connected in series with said source, means connected to said resistance for providing a voltage of substantially constant magnitude and of fixed phase relation to the voltage across the resistance, means connected to the electrodes for providing a voltage of substantially constant magnitude and of fixed phase relation to the potential difference across the electrodes, means connected to said two last named means for adding the voltages produced thereby to provide a resultant voltage which is a function of the phase difference between the voltage across the resistance and the voltage across the electrodes, means for converting said resultant voltage to an electrical value that can be transmitted through conductors of considerable length, indicating means at the surface of the earth, and an electrical circuit for conducting said electrical value to said indicating means.

2. Apparatus for investigating earth formations traversed by a bore hole, comprising a pair of spaced apart electrodes in the bore hole, a source of high frequency alternating current connected to the electrodes, a substantially pure resistance connected in series with said source, a pair of automatic volume control amplifiers in the bore hole, each having input and output terminals, electrical connections between said resistance and the input terminals of one of said amplifiers, electrical connections between said electrodes and the input terminals of said other amplifier, an electrical network connected to the output terminals of said amplifiers to provide a resultant output that is a function of the phase difference between the outputs of the respective amplifiers, rectifying means connected to said network for rectifying the resultant output thereof, electrical indicating means at the surface, and an electrical circuit connecting said rectifying means to said indicating means.

3. Apparatus for investigating earth formations traversed by a bore hole, comprising a pair of spaced apart electrodes lowered into the bore hole, a source of high frequency alternating current connected to said electrodes through a fixed impedance, electronic rectifying means connected to said source and having a control element, electrical means connected to the electrodes for providing a voltage of substantially constant magnitude and bearing a fixed phase relation to the voltage across the electrodes, phase adjusting means connected between said electrical means and the control element of said electronic rectifying means, electrical indicating means at the surface of the earth, and an electrical circuit for conducting a component of the rectified output of said electronic rectifying means to said indicating means, said output being a function of the phase relation between the alternating voltage impressed upon said rectifying means and that impressed upon said control element.

4. Apparatus for investigating earth formations traversed by a bore hole, comprising a pair of spaced apart electrodes in the bore hole, a source of high frequency alternating current connected to the electrodes through a fixed impedance, half-wave electronic rectifying means having a control element and connected to said source of alternating current, an automatic volume control amplifier having input and output terminals, electrical connections between said electrodes and the input terminals of said amplifier, adjustable phase shifting means connected to the output terminals of said amplifier, electrical connections between said phase shifting means and the control element of said electronic rectifying means, a source of electrical energy for biasing said control element, a resistance connected in series with said electronic rectifying means, electrical indicating means at the surface of the earth, and an electrical circuit connecting said resistance with the indicating means.

5. Apparatus for investigating earth formations traversed by a bore hole, comprising a plurality of spaced apart electrodes lowered into the bore hole, a source of high frequency alternating current at the surface of the earth, said source having one terminal grounded and a second terminal connected through an automatic volume control amplifier to an electrode in the bore hole, a substantially pure resistance connected in series with said last named electrode in the bore hole, an electrical circuit connected to said resistance and to two other of said electrodes for providing an output that is a function of the phase difference between the voltage across the resistance and the voltage across said two other electrodes, and that can be transmitted through conductors of considerable length without material change, indicating means at the surface of the earth, and electrical connections between said electrical circuit and the indicating means.

6. Apparatus for obtaining indications of the difference in phase between two electrical values of fixed or variable magnitude comprising, means for producing a voltage of substantially constant magnitude, the phase of which bears a fixed relation to the phase of one of said values, means for producing a second voltage of substantially constant magnitude, the phase of which bears a fixed relation to the phase of the other of said values, means for combining said first and second voltage to produce a resultant voltage which is a function of the phase difference between said two electrical values, and means for obtaining indications that are a function of said resultant voltage.

7. Apparatus for investigating earth formations traversed by a bore hole, comprising means for passing high frequency alternating current through the earth formations from a point in the bore hole, means for producing in the bore hole a first high frequency alternating current value having a given phase with respect to said current, means for producing in the bore hole a second high frequency alternating current value having a given phase with respect to the potential difference caused by said current between two spaced apart points in the bore hole, means for modifying said first alternating current value by said second alternating current value to produce in the bore hole a third high frequency alternating current value related to the phase difference between said high frequency alternating current and the potential difference vetween said two spaced apart points in the bore hole, means for converting said third high frequency alternating current value to an alternating current value of different character that can be transmitted through conductors of considerable length without material change, means for transmitting said electrical value of different character to the surface of the earth, and an indicator of said electrical value of different character.

8. Apparatus for investigating earth formations traversed by a bore hole, comprising at least one electrode in the bore hole, a source of high frequency alternating current connected to said electrode for passing current therefrom through the surrounding formations, means in the bore hole for providing a first high frequency electrical value having a given phase with respect to said current, means in the bore hole for providing a second high frequency electrical value having a given phase with respect to the potential difference caused by said current between two spaced apart points in the bore hole, means in the bore hole for modifying said first alternating current value by said second alternating current value to produce in the bore hole a third high frequency alternating current value related to the phase difference between said alternating current and the potential difference between said two spaced apart points, means in the bore hole for converting said third electrical value to an electrical value of different character that can be transmitted through conductors of considerable length without material change, electrical indicating means at the surface of the earth, and an electrical circuit for conducting said electrical value of different character to said indicating means.

9. Apparatus for investigating earth formations traversed by a bore hole, comprising a pair of spaced apart electrodes in the bore hole, a source of high frequency alternating current connected to said electrodes, an impedance connected in series with said source, means connected to said impedance for providing a voltage of substantially constant magnitude and of fixed phase relation to the voltage across the impedance, means connected to said electrodes for providing a voltage of substantially constant magnitude and of fixed phase relation to the voltage across said electrodes, means connected to said two last named means for adding the voltages produced thereby to provide a resultant voltage which is a function of the phase difference between the voltage across the resistance and the voltage across the electrodes, means for rectifying said resultant voltage to produce an electrical value that can be transmitted through conductors of considerabel length, indicating means at the surface of the earth, and an electrical circuit for conducting said electrical value to said indicating means.

10. Apparatus for investigating earth formations traversed by a bore hole, comprising a plurality of spaced apart electrodes, a resistor connected to one of said electrodes, a source of high frequency alternating current of substantially constant amplitude for energizing said one electrode through said resistor, means for producing an electrical signal responsive to the phase of the potential across said resistor relative to the phase of the potential drop across two other of said electrodes, and means for transmitting said signal to the surface of the earth.

11. Apparatus for obtaining indications of the difference in phase between two electrical values of fixed or variable magnitude comprising electronic rectifying means having a cathode, an anode and a control electrode, means for impressing between said anode and said cathode a voltage of substantially constant magnitude, the phase of which bears a fixed relation to the phase of one of said values, means for impressing between said control electrode and said cathode a second voltage of substantially constant magnitude, the phase of which bears a fixed relation to the other of said values, and means responsive to the output of rectifying means for indicating a value that is a function of the phase difference between said electrical values.

CHARLES B. AIKEN.

REFERENCES CITED

The following references are of record in the file of this patent:

UNITED STATES PATENTS

| Number | Name | Date |
|---|---|---|
| 2,018,080 | Martienssen | Oct. 22, 1935 |
| 2,038,046 | Jakosky | Apr. 21, 1936 |
| 2,220,070 | Aiken | Nov. 5, 1940 |
| 2,225,668 | Subkow | Dec. 24, 1940 |
| 2,358,441 | Bowsky | Sept. 19, 1944 |
| 2,364,957 | Douglas | Dec. 12, 1944 |
| 2,398,800 | Millington | Apr. 23, 1946 |

OTHER REFERENCES

"Geophysical Exploration," page 695, by Heiland, pub. 1940 by Prentice Hall, Inc., N. Y.